United States Patent [19]

Hopkins et al.

[11] Patent Number: 4,534,945

[45] Date of Patent: Aug. 13, 1985

[54] STABILIZATION OF HIGH PURITY HYDROGEN PEROXIDE

[75] Inventors: Quentin G. Hopkins; Jhonce N. Browning, both of Charleston, W. Va.

[73] Assignee: FMC Corporation, Philadelphia, Pa.

[21] Appl. No.: 606,784

[22] Filed: May 3, 1984

[51] Int. Cl.$^3$ ............................................. C01B 15/02
[52] U.S. Cl. ..................................... 423/273; 423/272
[58] Field of Search ................... 423/272, 273, 584; 252/186.28, 186.29

[56] References Cited

U.S. PATENT DOCUMENTS

| 946,529 | 1/1910 | Arndts | 423/272 |
|---|---|---|---|
| 1,002,854 | 9/1911 | Liebknecht | 423/272 |
| 1,128,637 | 2/1915 | Trimble | 423/272 |
| 2,426,154 | 8/1947 | Reichert et al. | 423/272 |
| 3,194,768 | 7/1965 | Lindner et al. | 423/272 |
| 3,234,140 | 2/1966 | Irani | 252/186 |
| 3,383,174 | 5/1968 | Carnine et al. | 23/207.5 |
| 3,387,939 | 6/1968 | Reilly et al. | 23/207.5 |
| 3,681,022 | 8/1972 | Kibbel, Jr. et al. | 23/207.5 |
| 3,687,627 | 8/1972 | Stalter | 423/271 |
| 3,701,825 | 10/1972 | Radimer et al. | 423/273 |
| 3,781,409 | 12/1973 | Munday | 423/273 |
| 3,801,512 | 4/1974 | Solenberger | 252/186 |
| 3,864,271 | 2/1975 | Stalter | 252/99 |
| 4,061,721 | 12/1977 | Strong | 423/272 |
| 4,070,442 | 1/1978 | Watts | 423/272 |

FOREIGN PATENT DOCUMENTS 0097305 1/1984 European Pat. Off. .
2109495 9/1972 Fed. Rep. of Germany .

OTHER PUBLICATIONS

Schumb, et al, *Hydrogen Peroxide*, American Chemical Society Monograph Series, New York, Reinhold (1955) pp. 535–547.
Kirk-Othmer, *Encyclopedia of Chemical Technology*, vol. 13, 3rd Edition, New York, Wiley & Sons (1981) pp. 14–15.

*Primary Examiner*—John Doll
*Assistant Examiner*—Wayne A. Langel
*Attorney, Agent, or Firm*—Richard E. Elden; Eugene G. Seems

[57] ABSTRACT

An aqueous 25% to 35% solution of hydrogen peroxide with a residue on evaporation of 20 mg/l or less are stabilized against decomposition by a maximum of 1.4 mg/l tin. The tin is maintained in the solution in the form of a very fine colloidal sol by the addition of a maximum of 2–5 mg/kg of phosphate added as a phosphonic acid and a maximum of 5.5 mg/kg of a hydroxycarboxylic acid.

8 Claims, No Drawings

STABILIZATION OF HIGH PURITY HYDROGEN PEROXIDE

This invention relates to stabilizer systems for high purity hydrogen peroxide containing between 25 percent to 35 percent hydrogen peroxide.

Although hydrogen peroxide is unstable thermodynamically, it is not subject to natural autodecomposition processes when pure. Hydrogen peroxide however is subject to decomposition by heterogeneous or homogenous catalysts. The stabilizer system selected for hydrogen peroxide depends on the quantity and nature of the decomposition catalyst with which the hydrogen peroxide is expected to be contacted. For example, very pure, concentrated hydrogen peroxide stored by the manufacturer in large tanks needs very little stabilizer; but dilute hydrogen peroxide or concentrated hydrogen peroxide possibly subject to contamination by catalysts requires higher concentrations of stabilizers.

Very stringent specifications must be met by hydrogen peroxide for specialized uses, such as high purity hydrogen peroxide, for use by the semiconductor industry or for use as a reagent chemical. In such application, the hydrogen peroxide must be stable so that it will not decompose if contaminated with common decomposition catalysts, yet must contain the minimum additives possible in order to meet special needs. Generally, the hydrogen peroxide concentration specified is between 25% and 35% $H_2O_2$ by weight.

The majority of hydrogen peroxide stabilization studies have been directed towards the stabilization of hydrogen peroxide in concentrated solution for storage and shipment in aluminum containers or where the highly concentrated hydrogen peroxide is to be, or has been, diluted with either ordinary tap water or distilled water containing possible contaminants, such as iron and copper as well as other polyvalent cations, such as calcium, magnesium, and aluminum. Examples of such commercial formulations include U.S. Pat. No. 3,781,409; U.S. Pat. No. 3,681,022; U.S. Pat. No. 3,383,174; U.S. Pat. No. 3,701,825; and U.S. Pat. No. 4,061,721. These formulations are typical of hydrogen peroxide shipped in commerce and include those stabilized with organic compounds, such as organic phosphonic acids, which are well known in the art to be stabilizers for hydrogen peroxide either with or without added tin compounds. The combined effect of mixing two different stabilizer systems is rarely additive; the result may exceed the sum of the effects of the individual stabilizer components or the stabilizers may cancel each other and may result in little or no stabilization effect whatsoever.

The decomposition and stabilization of hydrogen peroxide has been reviewed through 1955 by Schumb et al, in *Hydrogen Peroxide,* American Chemical Society Monograph Series. New York: Reinhold Publishing Corporation (1955) pages 447 to 546; and more recently, through 1981, by Kirk-Othmer's *Encyclopedia of Chemical Technology,* Volume 13, 3rd Edition. New York: John Wiley & Sons (1981) pages 14 and 15, both of which are incorporated herein by reference. Tin compounds have long been known as effective stabilizers for hydrogen peroxide and Schumb et al review their application in detail. The optimum stannic oxide ($SnO_2$) concentration for 85 percent hydrogen peroxide is reported by Schumb et al to be 0.83 mg/l for 0.1 mg/l ferric iron. It is well known that the quantity of stabilizer required decreases with increasing concentration of the hydrogen peroxide. Therefore, the more dilute grades of hydrogen peroxide require a higher tin content than that reported by Schumb et al for 85 percent hydrogen peroxide. It is well known that aluminum metal and aluminum ions do not decompose hydrogen peroxide catalytically. However, the presence of aluminum ions causes tin stabilizers to precipitate from hydrogen peroxide. U.S. Pat. No. 3,356,457 to Morris et al teaches that a maximum 0.2 mg/l aluminum can be present in a tin-stabilized hydrogen peroxide formulation. However, in the presence of a phosphate stabilizer the tin-stabilized peroxide can tolerate up to 1 mg/l aluminum ion.

In U.S. Pat. No. 3,234,140 to Irani amino tris(methylenephosphonic acid) is taught as a stabilizer for hydrogen peroxide solutions when the phosphonic acid is present in concentrations from about 0.001% to about 5%. U.S. Pat. No. 3,383,174 to Carnine et al teaches a synergistic combination of 50 to 300 mg/l amino tris(methylenephosphonic acid), also called nitrilo trimethylene phosphonic acid, with 10 to 150 mg/l of tin added as sodium stannate. U.S. Pat. No. 3,861,022 to Kibbel et al discloses 35 percent hydrogen peroxide formulations containing 300 mg/l of tin in the form of a soluble alkali metal salts, such as sodium stannate, and 1250 mg/l amino tris(methylenephosphonic acid). U.S. Pat. No. 3,701,825 to Radimer et al teaches that ethylenediamine tetra(methylenephosphonic acid) is effective to stabilize hydrogen peroxide.

U.S. Pat. No. 3,387,939 to Reilly et al teaches that at least 20 mg/l of an alkidenephosphonic acid is necessary to inhibit the precipitation of tin stabilizer by aluminum and other polyvalent cations. The Reilly et al patent also discloses that for optinum stability it is desirable to adjust the pH of the hydrogen peroxide to the equivalence point if necessary by adding any suitable acid, such as nitric acid, sulfuric acid, lactic acid, citric acid and the like.

For many applications, such as reagent chemical and semiconductor, uses the high concentrations of stabilizer taught to be necessary by the prior art are unacceptable. The present invention is for a very pure, aqueous solution of hydrogen peroxide having a maximum residue after evaporation of 20 milligrams per liter and containing 25 percent to 35 percent hydrogen peroxide by weight. For example, the ACS specification for reagent hydrogen peroxide calls for a maxium residue after evaporation of 20 mg/l for hydrogen peroxide which assays between 29.0 and 32.0 percent. It is well known that the tin compounds used to stabilize hydrogen peroxide are in the form of colloidal particles which can be coagulated and neutralized by positive ions, such as calcium, magnesium, and aluminum, as well as common decomposition catalysts.

Negative ions such as pyrophosphates, phosphates and sulfates are known to improve the stability of colloidal stannic oxide. However, the quantities of these materials, which are the critical minimum according to the prior art, cannot be used for reagent hydrogen peroxide because a maximum of 2 mg/l phosphorus as phosphate and 5 mg/l of sulfate is specified. It is critical for the stabilizer content of hydrogen peroxide for such uses to be reduced *far below* the usage rates taught to be the critical minimum by the prior art. Further, it is commom practice for many users of hydrogen peroxide to filter the hydrogen peroxide through 8 μm or finer filters. Such filtration reduces the particulate matter in the solution and also reduces the tin oxides present in colloidal form in the solution if not adequately peptized.

Tin oxides are necessary to prevent the hydrogen peroxide from decomposing if it is subsequently contaminated with heavy metals. The problem is, therefore, maintaining the necessary tin oxide colloid as very fine particles which are not coagulated and removed by settling or filtration and at the same time meeting the critical specification, such as a maximum residue on evaporation of 20 mg/l.

According to the present invention an aqueous hydrogen peroxide solution can be prepared with a maximum residue after evaporation of 20 milligrams per liter and stabilized against decomposition by contaminants, said aqueous solution comprising: 25 percent to 35 percent hydrogen peroxide by weight; 0.1 to 1.4 mg/kg of tin; 0.1 to 2.5 mg/l of phosphate added as an organic phosphonic acid; and 0.1 to 5.5 mg/kg of citric acid. The phosphonic acid and the citric acid may be added either as the free acid, an alkali metal or ammonium salt or as a mixture of a free acid and a salt as necessary to adjust the pH within the desired range.

Normally the tin is added as an alkali metal stannate, such as sodium stannate trihydrate or potassium stannate trihydrate. However, the tin may be added as a stannic oxide gel or any other convenient form. One of skill in the art will readily recognize that when the tin is added as an alkali metal salt a greater proportion of the free phosphonic and hydroxycarboxylic acids are required to adjust the pH to the desired range.

Any organic phosphonic acid may be used in the practice of the present invention. These phosphonic acids may include those with a nitrogen which is capable of being oxidized to an N-oxide, such as amino tris(methylenephosphonic acid) and ethylenediamine tetra(methylenephosphonic acid), or those not capable of being oxidized, such as an alkidene phosphonic acid, for example, 1-hydroxyethyl-1,1-diphosphonic acid.

Acids have long been known to be useful as buffering agents and to adjust the pH of a hydrogen peroxide formulation to within the optimum range. U.S. Pat. No. 3,387,939 discloses that any suitable acid may be used to adjust the pH, for example, nitric acid, sulfuric acid, lactic acid, and citric acid. However, the prior art as a whole neither discloses nor suggests that citric acid and/or salt is effective in tin stabilized hydrogen peroxide formulation either as a stabilizing agent or as a peptizing agent to maintain a colloidal tin sol in the solution.

It was unexpectedly discovered that citric acid are effective in improving the stability of 25% to 35% hydrogen peroxide solutions stabilized with tin and containing a maximum residue on evaporation of 20 mg/l. Although the mechanism is not known, it is believed to be related to the high purity of the hydrogen peroxide of the present invention compared with the heavily-stabilized hydrogen peroxide of the prior art. For example, Davis et al, "The Kinetics of Iodide-Catalyzed Reaction Between Hydrogen Peroxide and Hydrazine in Acid, Aqueous Solution," *J. Chem. Soc.*, 1953, pp 1902–06, teaches that the metallic impurities present in ordinary "pure" reagents were sufficient to catalyze a reaction between hydrogen peroxide and hydrazine. The addition of 0.002 M (6.72 mg/l) ethylenediaminetetraacetic acid disodium salt (EDTA) was sufficient to remove the effect of the catalyst on the reaction. In the present invention, using 25% to 35% hydrogen peroxide containing a maximum residue on evaporation of 20 mg/l, it was found that EDTA had no significant effect either on the stability of the hydrogen peroxide or on the amount of tin retained after filtration. It is clear from the disclosure of the prior art as a whole and the Davis et al disclosure in particular that catalytic reactions in hydrogen peroxide solutions cannot be compared unless the solutions are of substantially the same purity.

EXAMPLES

Comparative Example

A factorial experiment was designed to determine the effect of variables, such as tin concentration, the presence and/or absence of a phosphonic acid, an inorganic pyrophosphate and aluminum. The responses determined were the tin retention and hydrogen peroxide stability.

A pure, unstabilized hydrogen peroxide was adjusted to a concentration of about 31% $H_2O_2$ by weight. The planned additives were added; tin as sodium stannate trihydrate, phosphonic acid as nitrilo tris(methylenephosphonic) acid; pyrophosphate as sodium acid pyrophosphate, and aluminum as aluminum nitrate. The tin was determined by plasma arc spectroscopy immediately after filtration through a 0.22 $\mu$m filter. The percent change of the tin concentration compared to the initial concentration prior to filtration was reported. The hydrogen peroxide stability was determined by filtering the hydrogen peroxide through the 0.22 $\mu$m filter and determining the percent hydrogen peroxide retained in the filtered sample after 24 hours at 100° C. Tin determinations and stability were determined as above on the samples when prepared and after 1 day storage. Concentrations are reported as milligrams per kilogram of dilute hydrogen peroxide (1 mg/kg=0.0001% by weight).

The actual experimental conditions and results are summarized in Table I together with the first order difference of the responses to the high and low levels of the independent variables "Response Difference" and the sum of the total responses "Response Sum". Those Response Differences which are considered to be significant are indicated by an asterisk.

From Table I it can be seen that the initial tin concentration is not a critical variable. Both the phosphonic acid and the sodium acid pyrophosphate concentrations indicate a significant positive effect by the tin Response Difference; the aluminum had a significant negative effect. None of the variables had a significant effect on the stability. This is to be expected as none of the samples contained decomposition catalysts.

Example 1

A factorial experiment similar to the comparative example was set up in which the independent variables were 1 mg/kg tin added either as potassium stannate trihydrate or as sodium stannate trihydrate, and the presence or absence of 1 mg/kg of the following: ethylenediaminetetraacetic acid (EDTA), nitrilo tris(methylenephosphonic acid), and citric acid. In addition, each sample contained 0.5 mg/kg of aluminum added as aluminum nitrate. The results are summarized in Table II.

It was expected that the presence of a phosphonic acid was found to be significant, but it was unexpected that the efficacy of the phosphonic acid decreased after one day. This suggests that the phosphonic acid might be decomposed. It was also unexpected that the presence or absence of EDTA was not significant in view of the Davis et al publication supra. However, the hydrogen peroxide of the Davis et al had a residue on evaporation in excess of 670 mg/l and was not a high purity hydrogen peroxide with a residue on evaporation of less than 20 mg/l.

It was even more unexpected to observe that the Response Difference of citric acid was not only more significant than that of a phosphonic acid, but also that the Response Difference did not decrease as much with time. This observation is difficult to understand in view of the lack of significance of the Response Difference of EDTA which was known to have an effect in hydrogen peroxide solutions with greater residue on evaporation.

The effect of citric acid is particularly surprising in that the prior art has considered citric acid to be suitable for use as an acidulant in less pure commercial hydrogen peroxide solutions. Maintaining tin as a sol in hydrogen peroxide solutions or its use in stabilized hydrogen peroxide formulations other than as an acidulant has remained undiscovered until the present time.

Pursuant to the requirements of the patent statutes, the principle of this invention has been explained and exemplified in a manner so that it can be readily practiced by those skilled in the art, such exemplification includes what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

TABLE I (Comparative Example)
The Effects of Contaminants and Recipe Variations

| Run | $X_1$ | $X_2$ | $X_3$ | $X_4$ | Day 0 $Y_1$ $\Delta Sn\%$ | Day 1 $Y_1$ $\Delta Sn\%$ | Day 0 $Y_2$ $\Delta H_2O_2\%$ | Day 1 $Y_2$ $\Delta H_2O_2\%$ |
|---|---|---|---|---|---|---|---|---|
| 1 | − | − | − | − | −50 | −100 | 93.8 | 60.7 |
| 2 | + | − | − | + | −86 | −94 | 91.1 | 74.0 |
| 3 | − | + | − | + | −44 | −79 | 95.6 | 81.8 |
| 4 | + | + | − | − | −6 | −4 | 98.3 | 98.9 |
| 5 | − | − | + | + | −98 | −96 | 94.7 | 37.5 |
| 6 | + | − | + | − | −6 | +2 | 98.5 | 97.7 |
| 7 | − | + | + | − | 0 | +4 | 95.1 | 83.8 |
| 8 | + | + | + | + | 1 | +4 | 98.3 | 91.5 |
| 9 | − | − | − | + | −92 | −94 | 71.3 | 53.5 |
| 10 | + | − | − | − | −97 | −22 | 52.8 | 90.5 |
| 11 | − | + | − | − | −36 | −12 | 21.2 | 89.4 |
| 12 | + | + | − | + | −84 | −82 | 32.7 | 65.7 |
| 13 | − | − | + | − | 8 | −6 | 82.7 | 80.8 |
| 14 | + | − | + | + | −94 | −100 | 63.0 | 60.3 |
| 15 | − | + | + | + | −26 | −2 | 68.3 | 81.5 |
| 16 | + | + | + | − | −10 | −9 | 97.8 | 93.1 |
| Response Sum | | | | | −720 | −690 | 1256 | 1293 |
| $X_1$ - Response Difference | | | | | −44 | 80 | 10.3 | 102 |
| $X_2$ - Response Difference | | | | | 310* | 330* | −40.1 | 129 |
| $X_3$ - Response Difference | | | | | 270* | 284* | 141 | 14 |
| $X_4$ - Response Difference | | | | | −326* | −396* | −25.7 | −147 |
| Notes | | | | | | | | |
| Variables | | | | | − | + Level (Mg/Kg) | | |
| $X_1 =$ Stannate Concentration | | | | | 0.5 | 1.0 | | |
| $X_2 =$ Phosphonic Acid | | | | | 0 | 2.0 | | |
| $X_3 =$ Sodium Acid Pyrophosphate | | | | | 0 | 2.0 | | |
| $X_4 =$ Aluminum Concentration | | | | | 0 | 0.5 | | |

Responses
$Y_1 = \Delta Sn\%$ After 0.22 μm Filtration
$Y_2 = \Delta H_2O_2\%$ Stability After 0.22 μm Filtration
*Response Difference is Significant

TABLE II (Example 1)
Stabilized Hydrogen Peroxide Solution

| Run | $X_1$ | $X_2$ | $X_3$ | $X_4$ | Day 0 $Y_1$ $\Delta Sn\%$ | Day 1 $Y_1$ $\Delta Sn\%$ | Day 1 $Y_2$ $\Delta H_2O_2\%$ |
|---|---|---|---|---|---|---|---|
| 1 | − | − | − | − | −98 | −100 | −0.05 |
| 2 | + | − | − | − | −97 | −100 | −0.06 |
| 3 | − | + | − | − | −96 | −100 | −0.12 |
| 4 | + | + | − | − | −99 | −100 | −0.09 |
| 5 | − | − | + | − | −84 | −39 | −0.20 |
| 6 | + | − | + | − | −81 | −82 | −0.19 |
| 7 | − | + | + | − | −82 | −43 | −0.19 |
| 8 | + | + | + | − | −73 | −41 | −0.16 |
| 9 | − | − | − | + | −79 | −33 | −0.08 |
| 10 | + | − | − | + | −82 | −30 | −0.10 |
| 11 | − | + | − | + | −72 | −45 | −0.12 |
| 12 | + | + | − | + | −80 | −39 | −0.12 |
| 13 | − | − | + | + | +1 | +54 | −0.18 |
| 14 | + | − | + | + | 0 | −44 | −0.15 |
| 15 | − | + | + | + | −5 | −71 | −0.20 |
| 16 | + | + | + | + | +5 | +53 | +0.31 |
| Response Sum | | | | | −1022 | −974 | −2.32 |
| $X_1$ - Response Difference | | | | | 8 | −4 | −0.04 |
| $X_2$ - Response Difference | | | | | 18 | −10 | −0.3 |
| $X_3$ - Response Difference | | | | | 384* | 120* | −0.84* |
| $X_4$ - Response Difference | | | | | 398* | 236* | |
| $X_{3-4}$ - Response Difference | | | | | 244 | −270 | |
| Notes | | | | | | | |
| Variables | | | | | − Level (Mg/Kg) | + | |
| $X_1 =$ Type of Stannate | | | | | K | Na | |
| $X_2 =$ Ethylenediaminetetraacetic acid | | | | | 0 | 5 | |
| $X_3 =$ Nitrillo tris(methylene phosphonic acid) | | | | | 0 | 2 | |
| $X_4 =$ Citric Acid Concentration | | | | | 0 | 5 | |

Responses
$Y_1 = \Delta Sn\%$ After 0.22 μm Filtration
$Y_2 = \Delta H_2O_2\%$ Stability after 0.22 μm Filtration
*Response Difference is Significant

What is claimed is:

1. A 25% to 35% aqueous solution of hydrogen peroxide stabilized against decomposition in the presence of polyvalent cations so as to exhibit a maximum residue on evaporation of 20 mg/l comprising as a stabilizer 0.1 to 1.4 mg/kg of tin, 0.1 to 2.5 mg/kg of phosphate added as an organic phosphonic acid and 0.1 to 5.5 mg/kg of citric acid.

2. The composition of claim 1 wherein the organic phosphonic acid is amino tris(methylenephosphonic acid).

3. The composition of claim 1 wherein the organic phosphonic acid is ethylenediamine tetra(methylenephosphonic acid).

4. The composition of claim 1 wherein the organic phosphonic acid is 1-hydroxyethyl-1,1-diphosphonic acid.

5. A method for stabilizing an aqueous solution of 25% to 35% hydrogen peroxide against decomposition in the presence of polyvalent cations so as to exhibit a maximum residue on evaporation of 20 mg/l comprising incorporating into the hydrogen peroxide 0.1 to 1.4 mg/kg of tin, 0.1 to 2.5 mg/kg of phosphate added as an organic phosphonic acid and 0.1 to 5.5 mg/kg of citric acid or a salt thereof.

6. The method of claim 5 wherein the organic phosphonic acid is amino tris(methylenephosphonic acid).

7. The method of claim 5 wherein the organic phosphonic acid is ethylenediamine tetra(methylenephosphonic acid).

8. The method of claim 5 wherein the organic phosphonic acid is 1-hydroxyethyl-1,1-diphosphonic acid.

* * * * *